UNITED STATES PATENT OFFICE.

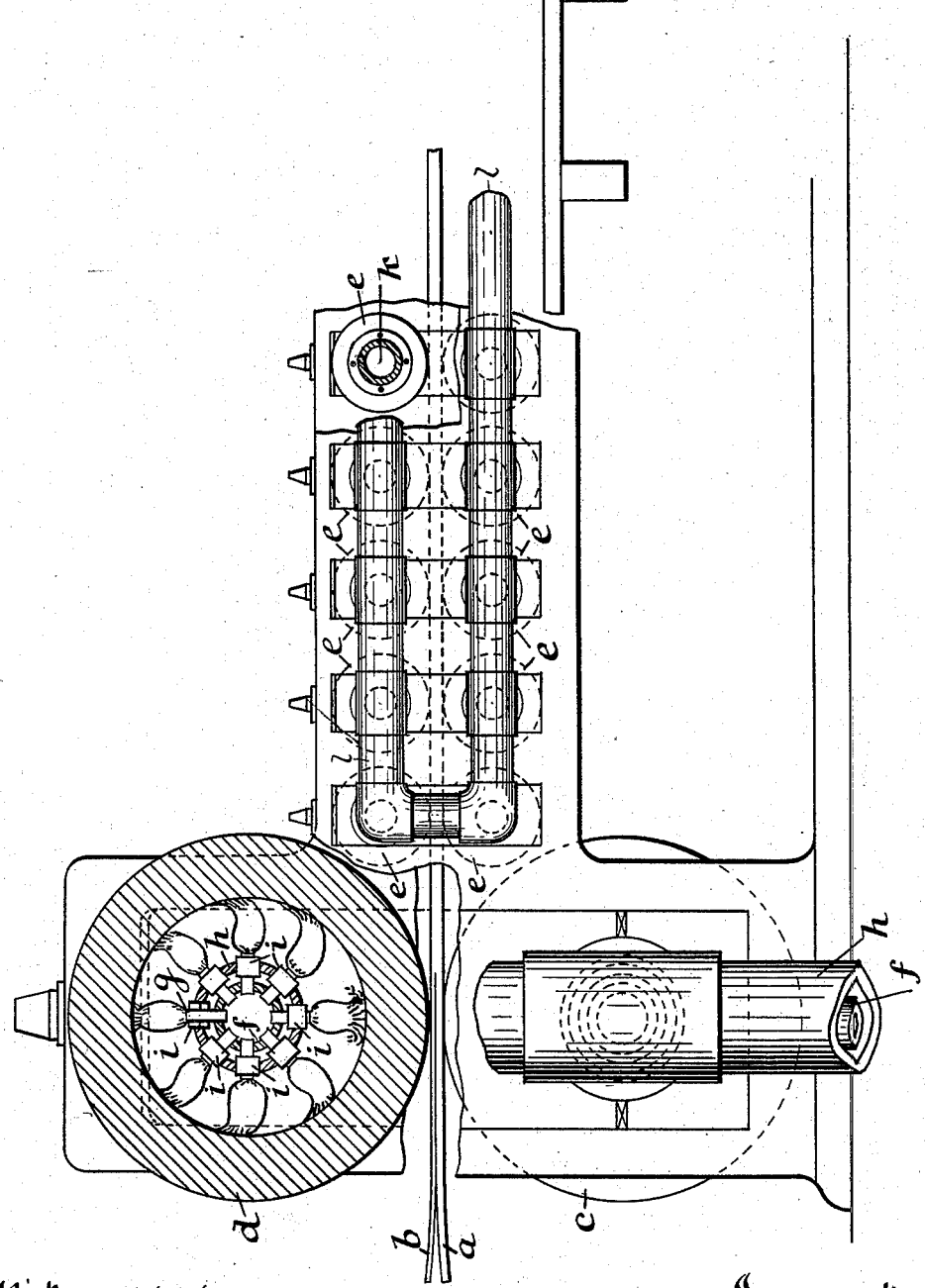

ERIK W. ENCQUIST, OF BROOKLYN, NEW YORK.

APPARATUS FOR SOLDERING PLATES OF IRON OR STEEL WITH SHEETS OF COPPER OR ITS COMPOSITIONS.

SPECIFICATION forming part of Letters Patent No. 557,979, dated April 7, 1896.

Application filed March 22, 1895. Serial No. 542,816. (No model.)

*To all whom it may concern:*

Be it known that I, ERIK W. ENCQUIST, a subject of the King of Sweden and Norway, and a resident of Brooklyn, in the county of Kings and State of New York, have invented certain new and useful Apparatus for Soldering Plates of Iron or Steel with Sheets of Copper or its Compositions, of which the following is a specification.

The essential object of my invention is to provide improved apparatus to weld or otherwise unite plates of iron or steel with sheets of copper or its compositions, for the production of compound plates whereof the iron or steel will be partly or wholly coated with a protective metal of any desired thickness—as, for instance, to make plates for ships composed in large part of iron or steel for strength with an exterior coating of copper or its compositions to resist oxidation of the iron or steel and for smoother surfaces, as hereinafter described, reference being made to the accompanying drawing, in which I represent a sectional elevation of apparatus of my invention and a couple of sheets of metal in the process of being welded.

The mode of utilizing the invention consists in tinning a side or sides of the plates or sheets of metal to be united, placing them together with their tinned sides in contact, or placing the plates or sheets (previously cleaned) together with tin or solder in suitable form between them, and also chemicals for preventing oxidation, and passing them through rolls heated sufficiently to fuse the tin or solder and adapted to press them together with suitable force to cause the tinned or solder-coated surfaces of the two plates to unite or combine, and then cooling the plates while thus united and subject to pressure.

In the drawing, $a$ represents a sheet of iron or steel having the upper surface tinned in any approved way.

$b$ represents a copper sheet having the lower surface suitably tinned and being laid on the tinned surface of sheet $a$.

$c$ and $d$ represent a pair of hot rolls between which the tinned sheets are to be passed and at the same time be subjected to pressure for uniting the fused tin surfaces of the two plates.

$e$ represents cold rolls for receiving the united sheets and cooling them and also pressing them at the same time.

If desired, fine particles of solder may also be introduced between the tinned surfaces of the plates as additional means of uniting them.

When the plates are tinned, the tinned surfaces may be coated with varnish or any other protective coating to keep them clean while waiting for the uniting process.

The rolls $d$ may be heated by gas-jets located in the hollow cores of the rolls by pipes, as $f$, having burners $g$ placed at intervals along the same and provided with a blowpipe attachment, as $h\ i$, or by any other approved means. Several pairs of cooling-rolls $e$ will be employed, of which the first pair will be placed as close to the hot rolls as practicable, and the rest will also be in close proximity for insuring contact of the plates for proper cohesion. Some or all of these cooling-rolls may be constructed for the circulation of water through them for more effectually cooling the welded plates, as indicated at $k$, with pipes $l$ for supplying the water.

As copper expands and contracts more than iron or steel it is essential to keep the united parts between several pairs of rolls, as above, until cool or nearly so, whereby the drawing of the copper will continue until cold, and thus counteract its greater contraction.

It will be seen that rolls to apply the heat and press the plates together have the advantage over other means, as flat members of a press, in that the pressure is concentrated upon the line of impingement between the rolls so as to insure contact of the entire surfaces of the plates, though somewhat unequal in thickness, and they effect the necessary force of contact with far less pressure than is necessary in a press and accomplish the work more expeditiously.

I claim—

In apparatus for uniting plates of iron or steel with sheets of copper or its compositions side to side by means of heat, pressure and an intermediate uniting element, the combination with rolls adapted for pressing the plates and sheets together and melting the uniting element, and at the same time passing the plates along between them, of one or more pairs of cooling and pressing rolls to receive the united plates from the hot rolls and continue the pressure in the cooling process substantially as described.

Signed at New York city, in the county and State of New York, this 16th day of March, A. D. 1895.

ERIK W. ENCQUIST.

Witnesses:
W. J. MORGAN,
JOS. S. LOCKWOOD.

It is hereby certified that the name of the patentee in Letters Patent No. 557,979, granted April 7, 1896, for an improvement in "Apparatus for Soldering Plates of Iron or Steel with Sheets of Copper or its Compositions," was erroneously written and printed "Erick W. Encquist," whereas said name should have been written and printed *Erick W. Enequist;* and that the said Letters Patent should be read with this correction therein that the same may conform to the record of the case in the Patent Office.

Signed, countersigned, and sealed this 28th day of April, A. D. 1896.

[SEAL.]

WM. H. SIMS,
*First Assistant Secretary of the Interior.*

Countersigned:
S. T. FISHER,
*Acting Commissioner of Patents.*